(12) United States Patent
Struzynska-Piron et al.

(10) Patent No.: US 10,626,276 B2
(45) Date of Patent: Apr. 21, 2020

(54) SOLVENT RESISTANT POLYMERIC MEMBRANES

(71) Applicants: AGFA-GEVAERT, Mortsel (BE); KATHOLIEKE UNIVERSITEIT LEUVEN, Leuven (BE)

(72) Inventors: Izabela Struzynska-Piron, Mortsel (BE); Ivo Vankelecom, Mortsel (BE); Luc Vanmaele, Mortsel (BE); Johan Loccufier, Mortsel (BE)

(73) Assignees: AGFA-GEVAERT, Mortsel (BE); KATHOLIEKE UNIVERSITEIT LEUVEN, Leuven (BE)

( * ) Notice: Subject to any disclaimer, the term of this patent is extended or adjusted under 35 U.S.C. 154(b) by 94 days.

(21) Appl. No.: 15/403,530

(22) Filed: Jan. 11, 2017

(65) Prior Publication Data
US 2017/0121529 A1  May 4, 2017

Related U.S. Application Data

(62) Division of application No. 14/386,909, filed as application No. PCT/EP2013/055723 on Mar. 19, 2013, now abandoned.

(60) Provisional application No. 61/615,905, filed on Mar. 27, 2012.

(30) Foreign Application Priority Data

Mar. 23, 2012  (EP) ..................... 12161017

(51) Int. Cl.
| C09D 4/06 | (2006.01) |
| B01D 71/52 | (2006.01) |
| C08F 283/00 | (2006.01) |
| B01D 71/64 | (2006.01) |
| B01D 71/68 | (2006.01) |
| B01D 67/00 | (2006.01) |
| B01D 71/82 | (2006.01) |
| B01D 53/22 | (2006.01) |
| B01D 69/06 | (2006.01) |
| C09D 133/14 | (2006.01) |
| C09D 181/06 | (2006.01) |
| B01D 69/12 | (2006.01) |
| C08F 283/04 | (2006.01) |

(52) U.S. Cl.
CPC ............. *C09D 4/06* (2013.01); *B01D 53/228* (2013.01); *B01D 67/009* (2013.01); *B01D 67/0009* (2013.01); *B01D 67/0011* (2013.01); *B01D 67/0093* (2013.01); *B01D 69/06* (2013.01); *B01D 69/125* (2013.01); *B01D 71/52* (2013.01); *B01D 71/64* (2013.01); *B01D 71/68* (2013.01); *B01D 71/82* (2013.01); *C08F 283/00* (2013.01); *C08F 283/04* (2013.01); *C09D 133/14* (2013.01); *C09D 181/06* (2013.01); *B01D 2323/30* (2013.01); *B01D 2323/34* (2013.01); *B01D 2323/345* (2013.01); *B01D 2325/20* (2013.01); *B01D 2325/30* (2013.01)

(58) Field of Classification Search
CPC .......... C09D 4/06; B01D 74/64; B01D 69/06; B01D 71/52; B01D 71/68; B01D 69/125; B01D 71/82; B01D 67/0093; B01D 67/0011; B01D 67/009; B01D 2325/20; B01D 2323/345; B01D 2325/30; C08F 323/345
See application file for complete search history.

(56) References Cited

U.S. PATENT DOCUMENTS

| 5,264,166 A * | 11/1993 | White | B01D 61/02 210/500.39 |
| 5,788,862 A * | 8/1998 | Degen | B01D 65/102 210/490 |
| 5,885,456 A * | 3/1999 | Charkoudian | B01D 67/0018 210/500.27 |
| 6,319,404 B1 * | 11/2001 | Zhang | B01D 67/0006 210/500.27 |
| 2006/0135732 A1 * | 6/2006 | Yeager | B01D 67/0006 528/170 |
| 2010/0230351 A1 * | 9/2010 | Hoving | B01D 69/02 210/650 |
| 2011/0120940 A1 * | 5/2011 | Allen | B01D 69/12 210/500.35 |

FOREIGN PATENT DOCUMENTS

WO  WO 2010/111755  * 10/2010

OTHER PUBLICATIONS

Struzynska-Piron et al., "Solvent Resistant Polymeric Membranes", U.S. Appl. No. 14/386,909, filed Sep. 22, 2014.

* cited by examiner

Primary Examiner — Jessica M Roswell
(74) Attorney, Agent, or Firm — Keating and Bennett, LLP

(57) ABSTRACT

A radiation curable composition for preparing a polymeric membrane includes a) a membrane polymer selected from the group consisting of a polysulfone (PSU), a polyether sulfone (PES), a polyether etherketone (PEEK), a polyvinylchloride (PVC), a polyacrylonitrile (PAN), a polyvinylidene fluoride (PVDF), a polyimide (PI), a polyamide (PA) and copolymers thereof; b) a hydrophobic monomer or oligomer having at least two free radical polymerizable groups independently selected from the group consisting of an acrylate group, a methacrylate group, an acrylamide group, a methacrylamide group, a styrene group, a vinyl ether group, a vinyl ester group, a maleate group, a fumarate group, an itaconate group, and a maleimide group; and c) an organic solvent for the membrane polymer and the hydrophobic monomer. A polymeric membrane and a method for manufacturing the membrane are also disclosed.

5 Claims, No Drawings

SOLVENT RESISTANT POLYMERIC MEMBRANES

CROSS-REFERENCE TO RELATED APPLICATIONS

This application is a 371 National Stage Application of PCT/EP2013/055723, filed Mar. 19, 2013. This application claims the benefit of U.S. Provisional Application No. 61/615,905, filed Mar. 27, 2012, which is incorporated by reference herein in its entirety. In addition, this application claims the benefit of European Application No. 12161017.4, filed Mar. 23, 2012, which is also incorporated by reference herein in its entirety.

BACKGROUND OF THE INVENTION

1. Field of the Invention

The present invention relates to solvent resistant polymeric membranes and to methods for manufacturing these membranes.

2. Description of the Related Art

Polymeric membranes are widely used in separation technologies and the field of application is continuously expanding towards ever more demanding applications. The use of harsh solvents in different applications requires highly solvent resistant polymeric membranes. Conventional polymeric membranes using polymers such as polyimides and polyaryl sulfones are not sufficiently resistant towards heat and harsh solvents.

The general approach in polymer technology to enhance chemical resistance is to cross-link the polymers. Cross-linking is a process during which two or more polymer chains are connected to each other by joints, called crosslinks. Cross-linking can be physical with the cross-links being part of an intrinsic physical property of a crystalline, a semi-crystalline polymer or block copolymer, where crystallites or domains of the dispersed phase act as physical cross-links. Generally, polymeric membranes having physical cross-links exhibit poor solvent resistance.

Chemical cross-links are formed by a chemical reaction initiated by e.g. thermal treatment. WO2007/125367 A1 (IMP INNOVATIONS) discloses membranes formed from polyimides by phase inversion which are then crosslinked by addition of amine crosslinking agents that react with the imide groups of the polyimide creating amide bonds. The authors claim the membrane to be stable in DMF, NMP, DCM and 1,4-dioxane. A similar approach is disclosed by WO2008/138078 A1 (KU Leuven).

WO2010/111755 A2 (KU Leuven) discloses a simplified method for the preparation of crosslinked polyimide nanofiltration membranes, by adding the cross-linking agent to the polyimide polymer cast solution or to the phase inversion coagulation medium.

Often a post heat treatment is required to complete the thermal cross-linking of polymeric membranes, making manufacturing of these membranes less compatible with roll to roll production technology. In addition, cross-linking is only possible with certain specific polymers, such as polyimide. The modification of a non-cross-linkable polymer used in polymeric membranes to a cross-linkable copolymer represents not only an economic penalization, but often also leads to undesired changes in other properties of the membrane.

UV irradiation has been used in membrane technology for modifying the surface of a membrane in order to enhance the performance of the membrane such as permeability and selectivity. U.S. Pat. No. 5,468,390 (RENSSELAER POLYTECH) discloses a process for modifying the surface of aryl polysulfone membranes by placing an aryl polysulfone membrane into the presence of a hydrophilic vinyl monomer dissolved in a solvent and exposing it then to ultraviolet light. The resulting ultrafiltration and microfiltration membranes exhibit low fouling characteristics. Membrane fouling is a process where particles deposit onto a membrane surface or into membrane pores in a way that degrades the membrane's performance.

US2003209487 A1 (RENSSELAER POLYTECH) discloses a method for modifying a polyethersulfone membrane by immersing the membrane in a monomer solution and exposing it to UV irradiation having a wavelength of 280 nm to 300 nm. A similar method is disclosed by US2005139545 A1 (RENSSELAER POLYTECH) for photografting polyethersulfone or polysulfone membranes with various monomers, such as acrylic acid, N-vinyl-2-pyrrolidinone, and 2-hydroxyethyl-methacrylate; and also by US2002161066 A1 (University of Toulouse) for preparing a hollow fibre polysulfone membrane by immersion in a solution comprising acrylic acid and exposing it to UV light.

In another approach, blends of (co)polymers are used to prepare polymeric membranes. U.S. Pat. No. 5,885,456 (MILLIPORE) discloses a method for the preparation of a UF or MF membrane comprising a blend of a polysulfone polymer and a graft copolymer of the polysulfone polymer and a polymerized monomer. The graft copolymer membrane is obtained by casting a solution comprising polyethersulfone and the polymerizable monomer, and subsequently exposing the cast membrane to UV irradiation. The membrane obtained after coagulation exhibits a highly hydrophilic surface.

U.S. Pat. No. 5,079,272 (MILLIPORE) discloses a method for the preparation of a porous membrane formed from an interpenetrating polymer network of a hydrophobic polymer and a polymerized and crosslinked hydrophilic monomeric composition. A solution of the polymer and monomeric composition is cast, exposed to ultraviolet radiation, coagulated and dried. The resulting dried membrane is annealed in order to render its surface hydrophilic.

UV irradiation has been used in the above described membrane technology to synthesize an interpenetrating polymer network with a hydrophilic surface, as well as to synthesize copolymer membranes. In these approaches a hydrophilic monomer is added to the dope solution. The dope solution is cast, UV irradiated and finally coagulated to obtain a membrane. There is however little or no information on their resistance to organic solvents. Other methods to prepare fully solvent resistant membranes, e.g. by thermal crosslinking, require specially designed (co)polymers or post heat treatment steps, making the approaches expensive and less interesting from an economical point of view.

Therefore, there is still a need for fully inert membrane designs, accessible from industrially available compounds and compatible with a roll to roll production method.

SUMMARY OF THE INVENTION

It was surprisingly found that the above cited problems could be solved through a single step approach by coating a radiation curable composition containing a polymer for a membrane and a multifunctional hydrophobic monomer or oligomer having at least two free radical polymerizable groups on a porous substrate, followed, in order, by phase inversion and radiation curing.

Preferred embodiments of the present invention provide a method for manufacturing polymeric membranes exhibiting improved solvent resistance, more particularly with a preparation method compatible with roll to roll coating. In the latter, a continuous production of membranes integrated in a coating line becomes possible.

Preferred embodiments of the present invention provide highly solvent resistant polymeric membranes without affecting the filtration performance.

These and other objects and advantages of the present invention will become apparent from the detailed description below.

DETAILED DESCRIPTION OF THE PREFERRED EMBODIMENTS

Definitions

The term "actinic radiation" as used in disclosing the present invention, means electromagnetic radiation capable of initiating photochemical reactions.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

Radiation Curable Compositions

The radiation curable composition according to a preferred embodiment of the present invention for manufacturing a polymeric membrane including: a) a membrane polymer selected from the group consisting of a polysulfone (PSU), a polyether sulfone (PES), a polyether etherketone (PEEK), a polyvinylchloride (PVC), a polyacrylonitrile (PAN), a polyvinylidene fluoride (PVDF), a polyimide (PI), a polyamide (PA) and copolymers thereof; b) a hydrophobic monomer or oligomer having at least two free radical polymerizable groups, preferably at least three free radical polymerizable groups, and most preferably at least four free radical polymerizable groups which are independently selected from the group consisting of an acrylate group, a methacrylate group, an acrylamide group, a methacrylamide group, a styrene group, a vinyl ether group, a vinyl ester group, a maleate group, a fumarate group, an itaconate group, and a maleimide group; and c) an organic solvent for the membrane polymer and the hydrophobic monomer or oligomer.

In a preferred embodiment of the radiation curable composition, the membrane polymer is selected from the group consisting of a polysulfone, a polyether sulfone, a polyimide and a polyetheretherketone.

The radiation curable composition according to a preferred embodiment of the present invention is used to manufacture a polymeric membrane with an improved solvent resistance.

In a preferred embodiment of the radiation curable composition, the weight ratio between the polymer and the hydrophobic monomer or oligomer is between 10 to 1 and 1 to 1.

In a preferred embodiment of the radiation curable composition, the weight ratio between the polymer and the at least one photoinitiator is between 12 to 1 and 1 to 1.

Membrane Polymers

The membrane polymer is selected from the group consisting of a polysulfone (PSU), a polyether sulfone (PES), a polyether etherketone (PEEK), a polyvinylchloride (PVC), a polyacrylonitrile (PAN), a polyvinylidene fluoride (PVDF), a polyimide (PI), a polyamide (PA) and copolymers thereof.

The membrane polymer is preferably selected from the group consisting of a polysulfone, a polyether sulfone, a polyimide and a polyether etherketone; and even more preferably selected from the group consisting of a polysulfone and a polyether sulfone.

In a preferred embodiment, the membrane polymer is a polysulfone or a copolymer thereof having repeating units according to Formula (I):

—Ar1-SO$_2$—Ar2-X—(R1-Y)$_n$—     Formula (I), with:
- Ar1 and Ar2 represent an aryl group;
- Ar1 and Ar2 may represent the same aryl group or a different aryl group;
- X and Y are independently selected from the group consisting of an oxygen, a sulfur, an amine group and a substituted or unsubstituted methylene group;
- n is an integer representing 0 or 1;
- R1 is selected from the group consisting of an aryl group and a group according to Formula (II):

—Ar3-Z—Ar4-     Formula (II), with:
- Ar3 and Ar4 represent an aryl group;
- Ar3 and Ar4 may represent the same aryl group or a different aryl group;
- Z represents a group selected from the group consisting of O, S(O)$_m$, and a substituted or unsubstituted methylene group; and
- m is an integer representing 0 or 1.

In a particularly preferred embodiment X and Y represent an oxygen. In a even more preferred embodiment Ar1 to Ar4 represent a substituted or unsubstituted 1,4-phenylene group, an unsubstituted 1,4-phenylene group being particularly preferred.

Particularly preferred groups representing R1 are given in Table 1, without being limited thereto.

TABLE 1

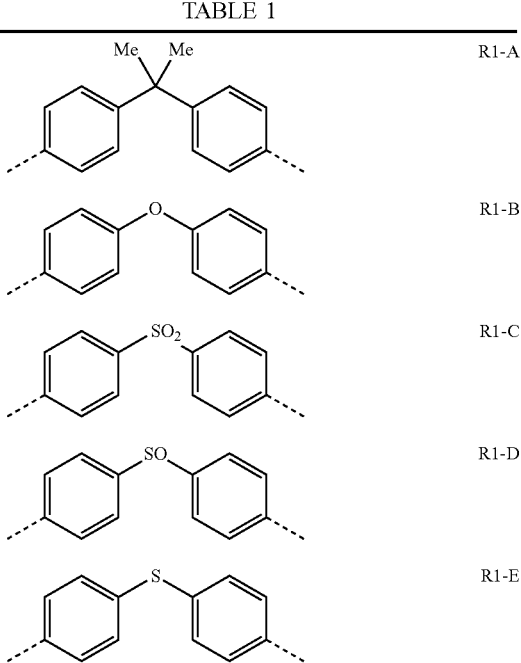

TABLE 1-continued

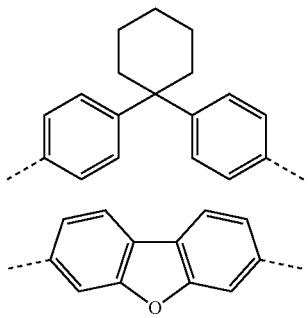

R1-F

R1-G

Preferred polysulfones and polyethersulfones are disclosed in EP0997182 A (ASAHI MEDICAL), EP1634610 A (TOYO BOSEKI), U.S. Pat. No. 6,045,899 (USF), US2006228483 A (AQUASOURCE), EP1733784 A (TOYO BOSEKI), EP1007195 A (USF), US2006076288 A (3M) and EP1609522 A (MILLIPORE).

Preferred commercially available polysulfones and polyethersulfones are the Udel™ types supplied by Solvay, more specifically the P-1835, P-3500 LCD, P-3500 LCD MB3, P-3500 LCD MB7 and P-3500 LCD MB8 grades, polysulfone P-1700 LCD being most preferred.

Organic Solvents

The organic solvent of the radiation curable composition is capable of dissolving the polymer and the hydrophobic monomer or oligomer. If present, the photoinitiator and the co-initiator is preferably also dissolved by the organic solvent.

The organic solvent may also be a mixture of solvents as long as they are capable of dissolving the polymer and the hydrophobic monomer or oligomer.

Preferred organic solvents are on or more organic solvents selected from the group selected of dimethylformamide (DMF), dimethylacetamide (DMAc), dimethylsulfoxide (DMSO), N-methylpyrrolidone (NMP), N-ethylpyrrolidone (NEP), tetrahydrofuran (THF), 1,4-dioxane, alcohols and ketones.

The organic solvent is most preferably a water-miscible organic solvent.

The coagulation bath includes one or a mixture of organic solvents and preferably also a surfactant, e.g. Triton™ X-100 (octylphenoxy-polyethoxyethanol). The conditions for effecting coagulation are well known to those skilled in the art.

Hydrophobic Monomers and Oligomers

The hydrophobic monomer or oligomer of the radiation curable composition has at least two, preferably at least three and most preferably at least four free radical polymerizable groups independently selected from the group consisting of an acrylate group, a methacrylate group, an acrylamide group, a methacrylamide group, a styrene group, a vinyl ether group, a vinyl ester group, a maleate group, a fumarate group, an itaconate group, and a maleimide group.

In a preferred embodiment, the free radical polymerizable groups of the hydrophobic monomer or oligomer are selected from the group consisting of an acrylate group and a methacrylate group, an acrylate group being the most preferred.

The hydrophobic monomer or oligomer of the radiation curable composition needs to be hydrophobic because hydrophilic monomers, such as acrylic acid and 2-hydroxyethyl-methacrylate, have a too high solubility in water whereby they are largely removed by the phase inversion step during the manufacturing of polymeric membranes and no longer available in the subsequent radiation curing step for improving the solvent resistance of the polymeric membrane.

In a preferred embodiment, the hydrophobic monomer or oligomer has a solubility in water at 20° C. of less than 20 mg/l, preferably less than 10 mg/l.

Particularly preferred hydrophobic monomers and oligomers are pentaerythritol tetraacrylate, ethoxylated pentaerythritol tetraacrylate, propoxylated pentaerythritol tetraacrylate, dipentaerythritol tetraacrylate, dipentaerythritol pentaacrylate, dipentaerythritol hexacrylate, ethoxylated dipentaerythritol tetraacrylate, ethoxylated dipentaerythritol pentaacrylate, ethoxylated dipentaerythritol hexaacrylate, propoxylated dipentaerythritol tetraacrylate, propoxylated dipentaerythritol pentaacrylate, propoxylated dipentaerythritol hexaacrylate, tetra-, penta- or hexafunctional urethane acrylate oligomers, tetra-, penta- or hexafunctional polyester acrylate oligomers and tetra-, penta- or hexafunctional polyether acrylate oligomers.

The hydrophobic monomers and oligomers preferably have a molecular weight of less than 5000 Da, more preferably less than 3000 Da.

Photoinitiators and Coinitiators

The majority of the photoinitiators can be classified as Norrish type I or Norrish type II initiators. Norrish type I initiators generate initiating radicals by α-cleavage upon exposure to UV radiation. Norrish type II initiators abstract a hydrogen from a second molecule, a so called coinitiator, upon exposure to UV light. The initiating radicals are formed on the coinitiator. The radiation curable composition according to the present invention preferably includes at least one photoinitiator. For fast curing, the at least one photoinitiator preferably has an absorption maximum at a wavelength above 320 nm, more preferably above 340 nm.

Particularly preferred bathochromic photoinitiators are thioxanthone photoinitiators, carbazole based photoinitiators and acyl phosphineoxide based photoinitiators, acyl phosphine based initiators being particularly preferred. In a preferred embodiment, the at least one photoinitiator is selected from the group consisting of a thioxanthone photoinitiator and an acyl phosphineoxide photoinitiator.

Typical preferred photoinitiators according to the present invention are given below in Table 2 without being limited thereto.

TABLE 2

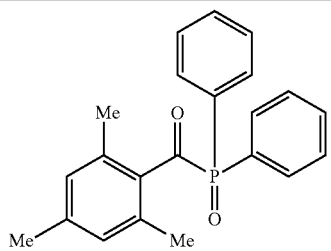 [SMILES: Cc1cc(C)c(C(=O)P(=O)(c2ccccc2)c2ccccc2)c(C)c1]

INI-1

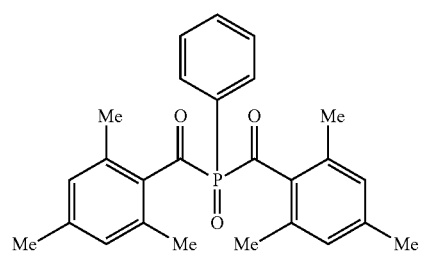 [SMILES: Cc1cc(C)c(C(=O)P(=O)(C(=O)c2c(C)cc(C)cc2C)c2ccccc2)c(C)c1]

INI-2

TABLE 2-continued

| | |
|---|---|
| INI-3 | 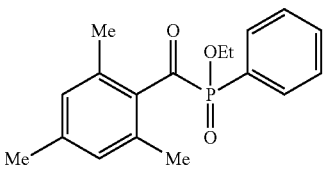 [SMILES: CCOP(=O)(C(=O)c1c(C)cc(C)cc1C)c1ccccc1] |
| INI-4 | 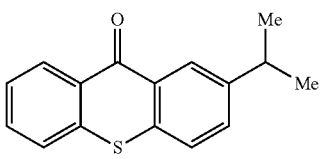 [SMILES: CC(C)c1ccc2sc3ccccc3c(=O)c2c1] |
| INI-5 | 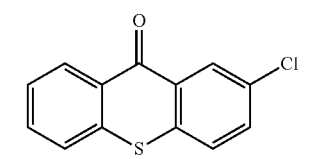 [SMILES: O=c1c2ccccc2sc2ccc(Cl)cc12] |
| INI-6 | 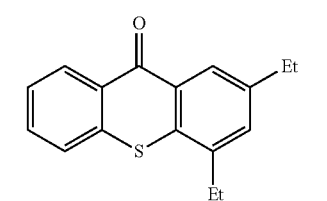 [SMILES: CCc1cc(CC)c2sc3ccccc3c(=O)c2c1] |
| INI-7 | 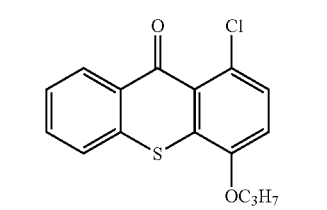 |
| INI-8 | 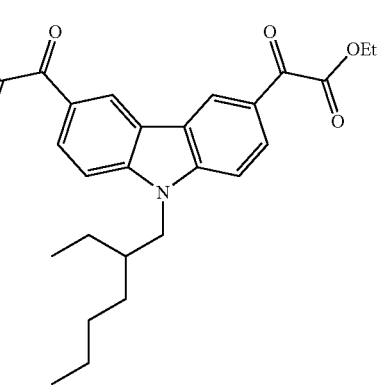 |
| INI-9 | 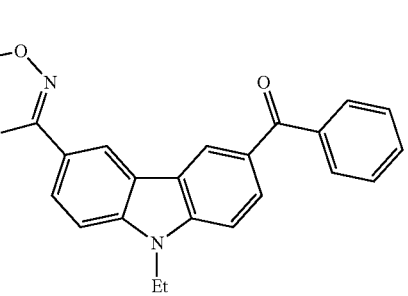 |

Coinitiators are preferably selected from aliphatic tertiary amines and dialkylamino substituted aromatic compounds, dialkylamino substituted aromatic compounds being more preferred, 4-dialkylamino benzoic acid esters being the most preferred.

The radiation curable composition according to a preferred embodiment of the present invention preferably includes a 4-dialkylaminobenzoic acid derivative as coinitiator.

In a preferred embodiment the polymer to initiator ratio is between 12 to 1 and 1 to 1, more preferably between 10 to 1 and 2 to 1, and most preferably between 8 to 1 and 3 to 1.

In another preferred embodiment the polymer to coinitiator ratio is between 12 to 1 and 1 to 1, more preferably between 10 to 1 and 2 to 1, and most preferably between 8 to 1 and 3 to 1.

Porous Supports

The radiation curable composition according to a preferred embodiment of the present invention is cast on a porous support. The porous support preferably has also a high resistance against organic solvents and other chemicals.

Preferred porous supports include woven or non-woven materials such as polyester/nylon fabrics, polyphenylene sulphide fabrics, cellulose/polyester fabrics, polytetrafluoroethylene, polyvinyl chloride, Teflon, sintered glass, glass fibres, ceramic supports, and a metal mesh.

Preferably, the supporting material is a non-woven fabric, such as polyethylene, polypropylene, a polyethylene/polypropylene blend or a polyester material.

Preferred porous supports are disclosed in EP0012557 A (ABCOR), U.S. Pat. No. 6,045,899 (USF), WO2007125367 A (IMP INNOVATIONS), US2010181253 A (EVONIK FIBRES), and WO2010111755 A (KU Leuven).

In view of its high solvent resistance, the supporting material is preferably a polyester support, more preferably a polyethylene terephthalate porous support, such as the Novatexx™ grades available from Freudenberg Filter Technologies.

There is no real limitation on the thickness of the porous support, but preferably the porous support has a thickness of at least 0.10 mm.

Methods for Manufacturing Polymeric Membranes

A method for manufacturing a polymeric membrane according to a preferred embodiment of the present invention includes, in order, the steps of:

a) preparing a radiation curable composition according to the present invention;
b) coating a layer of the radiation curable composition on a porous support;
c) phase inverting the coated layer; and
d) curing the phase inverted coated layer by actinic radiation.

The method is preferably performed by roll to roll coating.

Once the hydrophobic monomer or oligomer is added to the coating composition, the manufacturing steps are performed under light conditions in which actinic radiation has been substantially or fully excluded, and where necessary cooling of the radiation curable composition is foreseen to prevent build up of heat as much as possible.

The manufacturing steps will now be explained in more detail.

A. Preparation of the Radiation Curable Composition

In a preferred embodiment, the radiation curable composition is prepared in two steps. First, the polymer is dissolved in a suitable solvent at elevated temperature, usually in the range 50-150° C., preferably in the range 70-90° C.

Subsequently, the homogeneous polymer solution is cooled down and the hydrophobic monomer or oligomer and optionally a photoinitiator and a co-solvent are added.

Preferred radiation curable compositions have a polymer concentration ranging from 12 wt % to 30 wt %, preferable from 15 wt % to 25 wt %; the most preferable from 17 wt % to 22 wt % based on the total weight of the radiation curable composition.

B. Coating of the Radiation Curable Composition

Any industrial coating technique, suitable for the coating of highly concentrated polymer solutions can be used. Slot and extrusion coating techniques are particularly preferred. Slot and extrusion coating techniques belong to a class of coating methods known as premetered coating in which the thickness of the coated liquid is in principle set by the flow rate of the feed to the die, the width of the web and the speed of the substrate moving past and is independent of other process variables. When slot coating techniques are used, the dope at the impregnation temperature preferably has a viscosity at a shear rate of $1\ s^{-1}$ in the range of 1 to 500 mPa·s at 20° C. When slot coating techniques are used, the dope at the impregnation temperature preferably has a viscosity at a shear rate of $1\ s^{-1}$ of greater than $10^3$ mPa·s at 20° C.

C. Phase Inversion

In a preferred embodiment of the present invention, polymeric membranes are prepared by a phase inversion process which allows a controlled transformation of a polymer from solution to the solid state.

The polymeric solution may be inverted to a solid polymeric membrane by various phase inversion methods which include Liquid Induced Phase Separation (LIPS), where phase inversion is induced by immersion of the cast membrane in a non-solvent (or mixture of solvent and non-solvent), Vapour Induced Phase Separation (VIPS), where the initiating phase inversion medium is a vapour, Evaporation Induced Phase Separation (EIPS), where phase inversion is carried out by controlled evaporation of the solvent, as well as Thermal Induced Phase Separation (TIPS), where the membrane is prepared by thermal precipitation. Liquid Induced Phase Separation is particularly preferred.

D. Radiation Curing of the Membranes

The polymeric membrane according to a preferred embodiment of the present invention is cured by exposure to actinic radiation, such as γ-rays, electron beam radiation, UV- and visible light. The actinic radiation is preferably electron beam radiation and/or UV-light, more preferably UV-light.

Any ultraviolet light source, as long as part of the emitted light can be absorbed by the photoinitiator or photoinitiator system, may be applied as a radiation source, such as, a high or low pressure mercury lamp, a cold cathode tube, a black light, an ultraviolet LED, an ultraviolet laser and a flash light.

UV-light sources dominantly emitting in the UV-A region of the spectrum, defined as 320 to 400 nm, are particularly preferred. The UV-curing dose is preferably in the range from 1 to 20 J/cm²; more preferably from 3-15 J/cm² and most preferably from 7 up to 13 J/cm².

E. Membrane Conditioning

In a preferred embodiment, the method for manufacturing a polymeric membrane includes a step e) of conditioning the polymeric membrane by immersion of the cured polymeric membrane in a solution comprising a conditioning agent and a solvent.

Conditioning of the radiation cured polymeric membrane improves mechanical properties of the membrane, e.g. elasticity, as well as filtration properties, e.g. improved permeability by avoiding pore collapsing in the membrane.

The conditioning agent is preferably a low volatile organic liquid selected from the group consisting of glycols (polyalkylene glycols more preferably polyethylene glycol or polypropylene glycol), glycerols, mineral oils, synthetic oils, vegetable fats and oils are used.

The solvent for dissolving the one or more conditioning agents preferably includes one or more alcohols, ketones, hydrocarbons or mixtures thereof.

In a preferred embodiment, the radiation cured membrane is conditioned in a glycerol/isopropanol bath with a glycerol concentration of at least 30% (v/v). In the most preferred embodiment, the radiation cured membrane is conditioned for at least 24 h.

INDUSTRIAL APPLICABILITY

The polymeric membranes obtained from the methods according to preferred embodiments of the present invention can be used as filtration elements for microfiltration, ultrafiltration, nanofiltration, reverse osmosis, membrane distillation, pervaporation, gas separation, immobilizing biologically active species (e.g. enzyme and biofilm reactors); in membrane contactors e.g. supported liquid membranes, pertraction, water degassing, aeration, humidification (vapour permeation), controlled release; in membrane bioreactors (for permeate withdrawal) and in air conditioning for gas/air cleaning, and other membrane applications, especially those employing (aggressive) organic solvents.

The radiation cured polymeric membranes of the invention, especially the polysulfone membranes can be advantageously used in applications requiring solvent resistance, more particularly in separation processes which are performed in aprotic solvents, such as NMP, THF, and DMF.

EXAMPLES

Materials

All materials used in the following examples were readily available from standard sources such as ALDRICH CHEMICAL Co. (Belgium) and ACROS (Belgium) unless otherwise specified. The water used was deionized water.

TPO is 2,4,6-trimethylbenzoyl-diphenyl-phosphineoxide, a photoinitiator available as Darocur™ TPO from BASF.

BAPO is bis(2,4,6-trimethylbenzoyl)-phenylphosphineoxide, a photoinitiator available as Irgacure™ 819 from BASF.

PSf is polysulfone P-1700 supplied by Solvay and having the following structure:

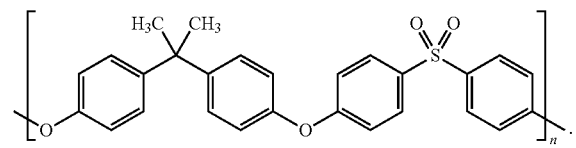

PI is a polyimide polymer available as Matrimid™ 9725 from HUNTSMAN.

SR285 is tetrahydrofurfuryl acrylate available as Sartomer™ SR285 from SARTOMER.

SR295 is pentaerythritol tetraacrylate available as Sartomer™ SR295 from SARTOMER.

SR351 is trimethylolpropane triacrylate available as Sartomer™ SR351 from SARTOMER.

SR399LV is dipentaerythritol pentaacrylate available as Sartomer™ SR399LV from SARTOMER.

M600 is dipentaerythritol hexaacrylate available as Miramer™ M600 from RAHN.

DEGDA is ethylene glycol diacrylate.

DMF is dimethylformamide.

THF is tetrahydrofuran.

Novatexx™ 2413 N is a porous PET polyester support having a weight of 100 g/m² and an air permeability of 300 l/m²s at 200 Pa, available from FREUDENBERG FILTER TECHNOLOGIES. Novatexx™ 2481 is a porous PET/PBT polyester support having a weight of 100 g/m² and an air permeability of 125 l/m²s at 200 Pa, available from FREUDENBERG FILTER TECHNOLOGIES.

Rose Bengal is 4,5,6,7-tetrachloro-2',4',5',7'-tetraiodofluorescein (CASRN 11121-48-5, C.I.45440), available from PFALZ & BAUER INC.

Test Methods

1. Solvent Resistance

The solvent resistance is tested by immersion of a membrane in an organic solvent at 20° C. for 24 hours and evaluated according to a criterion as disclosed in Table 3. The average solvent resistance is defined as the summation of all individual scores of solvent resistance divided by the number of organic solvents tested. The smaller this number, the higher the solvent resistance. An average solvent resistance over a wide range of different types of organic solvents should preferably not be more than 2.0, more preferably less than 1.0.

TABLE 3

| Score | Criterion |
|---|---|
| 0 | Stable membrane |
| 1 | Some swelling or shrinkage |
| 2 | Swelling or shrinkage |
| 3 | Pronounced swelling or shrinkage |
| 4 | Partially dissolved membrane |
| 5 | Dissolved membrane |

2. Filtration Performance

A filtration test was performed using a laboratory-made high-throughput (HT) filtration module. A solution of 17.5 µM of Rose Bengal (Mw=1017 Da) in IPA was used as feed. The separation was carried out under various pressures such as 10, 15, 20 or 27 bars depending on the membrane. The concentration of Rose Bengal in IPA was determined by means of UV/Vis spectrophotometry at $\lambda_{max}$=555 nm.

The retention R is calculated as a percentage from the measured concentration of Rose Bengal divided by the original concentration of Rose Bengal in the solution.

The permeability P is the volume of isopropanol collected after filtration for the same surface area of membrane and duration of filtration, taking into account the pressure applied.

Example 1

This example illustrates the effect of a polymeric membrane prepared using a radiation curable composition in accordance to a preferred embodiment of the present invention in comparison to a polymeric membrane prepared in the traditional manner without radiation curing.

Preparation of the Coating Compositions

The coating compositions COMP-1 and INV-1 to INV-4 were prepared using the components according to Table 4.

TABLE 4

| wt % of component: | COMP-1 | INV-1 | INV-2 | INV-3 | INV-4 |
|---|---|---|---|---|---|
| PSf | 21 | 21 | 21 | 21 | 21 |
| DMF | 67 | 61 | 61 | 54 | 54 |
| THF | 12 | 10 | 10 | 9 | 9 |
| SR399LV | — | 5 | 5 | 10 | 10 |
| TPO | — | 3 | — | 6 | — |
| BAPO | — | — | 3 | — | 6 |

The coating compositions were prepared by adding the membrane polymer polysulfone PSf to DMF and stirring the solution at 80° C. for 3 hours before cooling to 20° C.

The non-radiation curable coating composition COMP-1 was completed by addition of THF to the polysulfone solution and degassing the homogeneous solution for 2 hours in order to remove air bubbles.

The radiation curable coating compositions INV-1 to INV-4 were completed by adding to the polysulfone solution in DMF, in order, the multifunctional monomer, the photoinitiator and THF and stirring the homogeneous composition for 2 hours.

Preparation of the Membranes

First, non-woven polyethylene terephthalate porous supports were wetted by DMF. Then, the comparative coating composition COMP-1 was cast at a speed of 0.65 m/min and the inventive coating compositions INV-1 and INV-4 were cast at speed of 1.81 m/min, both using an automated casting knife (Braine Instruments) with a gap of 200 µm, on the wetted porous supports according to Table 5. Before immersion for 15 minutes into a coagulation bath containing distilled water for phase inversion, the membranes were exposed to air for 30 s to evaporate THF.

The membranes prepared using the radiation curable compositions INV-1 to INV-4 were then transported through a Fusion Systems with a UV exposure unit having a D-bulb above the conveyor belt at a speed of 10 m/min. The main irradiation light was UV-A (320-390 nm). The energy dose to cure a membrane was 11.87 J/cm².

TABLE 5

| Polymeric Membrane | Coating solution | Porous support |
|---|---|---|
| MEM-1 | COMP-1 | Novatexx ™ 2413 N |
| MEM-2 | INV-1 | Novatexx ™ 2481 |
| MEM-3 | INV-2 | Novatexx ™ 2481 |
| MEM-4 | INV-3 | Novatexx ™ 2413 N |
| MEM-5 | INV-4 | Novatexx ™ 2413 N |

Before testing the solvent stability and filtration performance, the comparative membrane MEM-1 and the inventive membranes MEM-2 to MEM-5 were impregnated for 48 h at room temperature in a bath containing 40% (v/v) of glycerol and 60% (v/v) of iso-propanol (IPA) and subsequently air-dried.

Evaluation of the Membranes

The solvent resistance of the air-dried membranes MEM-1 to MEM-5 were tested by means of immersion for 24 hours in 17 different organic solvents. The results are summarized in Table 6.

TABLE 6

| Organic Solvent | MEM-1 | MEM-2 | MEM-3 | MEM-4 | MEM-5 |
|---|---|---|---|---|---|
| Acetone | 4 | 0 | 0 | 0 | 0 |
| Acetonitrile | 0 | 0 | 0 | 0 | 0 |

TABLE 6-continued

| Organic Solvent | MEM-1 | MEM-2 | MEM-3 | MEM-4 | MEM-5 |
|---|---|---|---|---|---|
| Butyl acetate | 4 | 0 | 0 | 0 | 0 |
| Chlorobenzene | 5 | 3 | 3 | 3 | 3 |
| Cyclohexane | 0 | 0 | 0 | 0 | 0 |
| Cyclohexanone | 5 | 1 | 1 | 1 | 1 |
| Ethyl acetate | 4 | 0 | 0 | 0 | 0 |
| Iso-propanol | 0 | 0 | 0 | 0 | 0 |
| n-Heptane | 0 | 0 | 0 | 0 | 0 |
| n-Hexane | 0 | 0 | 0 | 0 | 0 |
| Methanol | 0 | 0 | 0 | 0 | 0 |
| NMP | 5 | 1 | 1 | 1 | 1 |
| Propylene carbonate | 0 | 0 | 0 | 0 | 0 |
| THF | 5 | 1 | 1 | 1 | 1 |
| Toluene | 5 | 0 | 0 | 0 | 0 |
| Triethylphosphate | 5 | 1 | 1 | 1 | 1 |
| Xylene mixture | 5 | 0 | 0 | 0 | 0 |
| Average solvent resistance | 2.8 | 0.4 | 0.4 | 0.4 | 0.4 |

From Table 6, it becomes immediately apparent that the inventive membranes MEM-2 to MEM-5 are highly solvent resistant.

The filtration performance of the comparative membrane MEM-1 and the inventive membranes MEM-2 to MEM-5 were tested after the membranes were rinsed in distilled water for 48 hours to remove glycerol. The results of the filtration tests are summarized in Table 7.

TABLE 7

| Polymeric Membrane | Permeability P (l m$^{-2}$ h$^{-1}$ bar$^{-1}$) | Retention R (%) |
|---|---|---|
| MEM-1 | 0.32 | 95 |
| MEM-2 | 0.19 | 94 |
| MEM-3 | 0.13 | 95 |
| MEM-4 | 0.22 | 94 |
| MEM-5 | 0.14 | 97 |

From Table 7, is should be clear that filtration performance of all membranes are comparable.

Example 2

This example illustrates the effect on solvent resistance of the number of free radical polymerizable groups of the hydrophobic monomer or oligomer in a radiation curable composition for manufacturing a polymeric membrane.

Preparation of the Coating Compositions

The comparative radiation curable composition COMP-2 and the inventive radiation curable compositions INV-5 to INV-9 were prepared in the same manner as in Example 1 but using the components in the weight percentages according to Table 8.

TABLE 8

| wt % of component: | COMP-2 | INV-5 | INV-6 | INV-7 | INV-8 | INV-9 |
|---|---|---|---|---|---|---|
| PSf | 21 | 21 | 21 | 21 | 21 | 21 |
| DMF | 60 | 60 | 60 | 60 | 60 | 60 |
| THF | 11 | 11 | 11 | 11 | 11 | 11 |
| TPO | 3 | 3 | 3 | 3 | 3 | 3 |
| SR285 | 5 | — | — | — | — | — |
| DEGDA | — | 5 | — | — | — | — |
| SR351 | — | — | 5 | — | — | — |
| SR295 | — | — | — | 5 | — | — |
| SR399LV | — | — | — | — | 5 | — |
| M600 | — | — | — | — | — | 5 |

Preparation of the Membranes

After the Novatexx™ 2413 N porous support was wetted by DMF, the radiation curable compositions COMP-2 and INV-5 and INV-9 were cast at speed of 1.81 m/min using an automated casting knife (Braine Instruments) with a gap of 200 μm on the Novatexx™ 2413 N porous support. Before immersion for 15 minutes into a coagulation bath containing distilled water, the membranes were exposed to air for 30 s to evaporate THF.

The membranes were stored in distilled water before the curing step, where they were transported through a Fusion Systems with a UV exposure unit having a D-bulb above the conveyor belt at a speed of 10 m/min. The main irradiation light was UV-A (320-390 nm). The energy dose to cure a membrane was 11.87 J/cm$^2$.

Before testing the solvent stability and filtration performance, the membranes were impregnated for 48 h at room temperature in a bath containing 40% (v/v) of glycerol and 60% (v/v) of iso-propanol (IPA) and subsequently air-dried.

Evaluation of the Membranes

The solvent resistance of the air-dried membranes MEM-6 to MEM-11 were tested by means of immersion for 24 hours in 7 of the most aggressive organic solvents used in Example 1. The results are summarized in Table 9.

TABLE 9

| Organic Solvent | MEM-6 | MEM-7 | MEM-8 | MEM-9 | MEM-10 | MEM-11 |
|---|---|---|---|---|---|---|
| THF | 5 | 5 | 5 | 2 | 2 | 2 |
| Acetone | 3 | 2 | 0 | 0 | 0 | 0 |
| Butyl acetate | 0 | 0 | 0 | 0 | 0 | 0 |
| Cyclohexanone | 5 | 5 | 5 | 2 | 2 | 2 |
| Ethyl acetate | 4 | 2 | 0 | 0 | 0 | 0 |
| Toluene | 3 | 0 | 0 | 0 | 0 | 0 |
| Mixture of xylenes | 0 | 0 | 0 | 0 | 0 | 0 |

The filtration performance of the membranes MEM-6 to MEM-11 was tested after the membranes were rinsed in distilled water for 48 hours to remove glycerol. The results of the filtration tests together with the average solvent resistance are summarized in Table 10.

TABLE 10

| Polymeric Membrane | Radiation Curable Composition | Number of Acrylate Groups | Average Solvent Resistance | Permeability P (l m$^{-2}$ h$^{-1}$ bar$^{-1}$) | Retention R (%) |
|---|---|---|---|---|---|
| MEM-6 | COMP-2 | 1 | 2.9 | 1.80 | 82 |
| MEM-7 | INV-5 | 2 | 2.0 | 2.55 | 70 |
| MEM-8 | INV-6 | 3 | 1.4 | 0.24 | 90 |
| MEM-9 | INV-7 | 4 | 0.6 | 0.27 | 89 |
| MEM-10 | INV-8 | 5 | 0.6 | 0.26 | 93 |
| MEM-11 | INV-9 | 6 | 0.6 | 0.14 | 93 |

From Table 10, it should be clear that the membrane MEM-6 made from a radiation curable composition with a hydrophobic monomer having a single free radical polymerizable group is not solvent resistant. The solvent resistance improves with the number of free radical polymerizable groups. No further improvement of solvent resistance was observed when the hydrophobic monomer or oligomer included at least four free radical polymerizable groups.

Example 3

This example illustrates that the improvement of solvent resistance is also obtained with a different type of membrane polymer than in Examples 1 and 2.

Preparation of the Coating Composition

A viscous solution containing 20.96 parts of polyimide (PI, Matrimid 9725) (Huntsman) and 53.50 parts of dimethylformamide (DMF) was stirred at 80° C. for 3 hours. Subsequently, the solution was cooled down to 20° C. and 9.47 parts of tetrahydrofuran (THF), 9.97 parts of the multifunctional monomer SR399LV, and 6.10 parts of the photoinitiator TPO were added under stirring. After obtaining a homogeneous solution, the casting solution was degassed for 24 hours in order to remove air bubbles.

Preparation of the Membrane

First, the Novatexx™ 2481 porous support was wetted by DMF. Then membranes with a wet thickness of 200 µm were cast at a speed of 1.81 m/min on the Novatexx™ 2481 porous support. The membranes were kept in air for 30 s to evaporate THF before the coagulation step by immersion for 15 minutes in distilled water.

The membranes were transported through a Fusion Systems with a UV exposure unit having a D-bulb above the conveyor belt at a speed of 10 m/min. The main irradiation light was UV-A (320-390 nm). The energy dose to cure a membrane was 11.87 J/cm$^2$.

Before testing the solvent stability and filtration performance, the membranes were impregnated for 48 h at room temperature in a bath containing 40% (v/v) of glycerol and 60% (v/v) of iso-propanol (IPA) and subsequently air-dried.

Evaluation of the Membranes

The radiation cured polyimide membranes were tested in the organic solvents of Example 1. After immersion in the different solvents, the membrane only delaminated from the polyester support and became gel-like without dissolving when immersing it in NMP. All other organic solvents had minor or no deteriorating effect on the solvent resistance of the radiation cured polyimide membrane.

The radiation cured polyimide membrane exhibited good filtration performance with a permeability of 1.45 l m$^{-2}$ h$^{-1}$ bar$^{-1}$ and retention of 96% for Rose Bengal.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a polymeric membrane, the method comprising, in order, the steps of:
    a) preparing a radiation curable composition including:
        a membrane polymer selected from the group consisting of a polysulfone (PSU), a polyether sulfone, a polyether etherketone, a polyvinylchloride, a polyacrylonitrile, a polyvinylidene fluoride, a polyimide, a polyamide, and copolymers thereof;
        a hydrophobic monomer or oligomer including at least two free radical polymerizable groups independently selected from the group consisting of an acrylate group, a methacrylate group, an acrylamide group, a methacrylamide group, a styrene group, a vinyl ether group, a vinyl ester group, a maleate group, a fumarate group, an itaconate group, and a maleimide group;
        an organic solvent for the membrane polymer and the hydrophobic monomer or oligomer; and
        an acyl phosphineoxide photoinitiator having a maximum absorption at a wavelength above 320 nm;
    b) coating a layer of the radiation curable composition onto a porous support;
    c) phase inverting the coated layer by coagulating the radiation curable composition; and
    d) curing the phase inverted coated layer by actinic radiation.

2. The method according to claim 1, wherein the step b) is performed by roll to roll coating.

3. The method according to claim 1, further comprising the step of:
    e) conditioning the polymeric membrane by immersing the polymeric membrane in a solution including a conditioning agent and a solvent.

4. The method according to claim 1, wherein the polymeric membrane includes the porous support.

5. The method according to claim 1, wherein the porous support is selected from the group consisting of a woven fabric, a non-woven fabric, polyester, polytetrafluoroethylene, polyvinyl chloride, sintered glass, glass fibres, a ceramic support, and a metal mesh.

* * * * *